(12) United States Patent
Venezia

(10) Patent No.: US 7,165,749 B2
(45) Date of Patent: Jan. 23, 2007

(54) INTERLOCKING AQUARIUM SUPPORT SYSTEM WITH INTERCHANGEABLE MULTIFUNCTIONAL DECORATIVE FACADE

(76) Inventor: Alberto John Venezia, 18642 Cape Sable Dr., Boca Raton, FL (US) 33498

( * ) Notice: Subject to any disclaimer, the term of this patent is extended or adjusted under 35 U.S.C. 154(b) by 115 days.

(21) Appl. No.: 10/945,214

(22) Filed: Sep. 20, 2004

(65) Prior Publication Data

US 2006/0060729 A1  Mar. 23, 2006

(51) Int. Cl.
*A47G 23/02* (2006.01)

(52) U.S. Cl. .......................................... 248/146; 40/312
(58) Field of Classification Search ................... 108/90; 312/263, 234; 211/189, 182; 40/312
See application file for complete search history.

(56) References Cited

U.S. PATENT DOCUMENTS

| | | | |
|---|---|---|---|
| 89,772 A | 5/1869 | Albrecht | |
| 3,566,808 A | 3/1971 | Slate et al. | |
| D240,871 S | 8/1976 | Herman | |
| 3,997,139 A * | 12/1976 | Young et al. | 248/165 |
| 4,179,169 A | 12/1979 | Daniels et al. | |
| D254,994 S | 5/1980 | Miereanu et al. | |
| 4,267,998 A | 5/1981 | Weirich | |
| 4,832,421 A | 5/1989 | Shoffner | |
| D304,982 S | 12/1989 | Bush et al. | |
| D321,571 S | 11/1991 | Lucariello | |
| D324,590 S | 3/1992 | Pixler | |
| 5,313,725 A * | 5/1994 | DeVassie | 40/312 |
| 5,335,605 A | 8/1994 | Drabczyk | |
| 5,527,103 A * | 6/1996 | Pittman | 312/263 |
| 5,645,331 A | 7/1997 | Eddy et al. | |
| 5,954,412 A * | 9/1999 | Rutherford et al. | 312/258 |
| 6,073,320 A * | 6/2000 | Salatin et al. | 27/27 |
| 6,454,261 B2 | 9/2002 | Ohira | |
| 6,619,601 B1 | 9/2003 | Vall | |
| 6,658,677 B2 | 12/2003 | Paul | |
| 6,902,074 B2 * | 6/2005 | Albrecht | 211/189 |

FOREIGN PATENT DOCUMENTS

JP 54-132075 * 10/1979 ................. 248/632

* cited by examiner

*Primary Examiner*—Ramon O Ramirez
(74) *Attorney, Agent, or Firm*—Rader, Fishman & Grauer PLLC

(57) ABSTRACT

The Interlocking Aquarium Support System with Multifunctional Decorative Facade allows for the façade of the aquarium stand to be changed without dismantling the aquarium system. The aquarium is supported end to end at center, front to back and under all sides by vertical supports, a base and top while still providing ample room for storage. The interlocking of the elements prevents movement of the aquarium under load. A foam layer between the aquarium and stand compensate for unevenness and vibration. The stand assembles and disassembles without tools or fasteners and stacks flat when not in use. The removable multifunctional decorative facade is constructed of various materials that provide decor and functionality such as storage, doors, folding sides, graphics, print, and perform functions that enable one to play games of skill or chance inside the aquarium where coin is exchanged for play and the controls are on the façade.

18 Claims, 5 Drawing Sheets

INTERLOCKING AQUARIUM SUPPORT SYSTEM WITH INTERCHANGEABLE MULTIFUNCTIONAL DECORATIVE FACADE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE OR A COMPUTER PROGRAM LISTING COMPACT DISK APPENDIX

Not applicable

BACKGROUND OF THE INVENTION

Since the creation of the very first aquariums there has been a requirement to safely support the aquarium and its contents, lower the risk of it cracking under the pressure of its own weight, provide storage and add a decorative element to the aquarium display.

The cabinetry that supports aquaria is different from ordinary cabinetry or furniture. The required functions of the aquarium stand pose certain challenges that must be met if the stand is to fulfill its purpose. Considerations of function, strength, weight, moisture, levelness, vibration, storage, size, overall cost, requirements for shipping, shipping costs and decorative elements must be addressed if the support is going to achieve its purpose and be successful in the marketplace. The balance between form and function leave countless variations and opportunities to design an original aquarium stand.

The aquarium stands of the prior art achieve basic function. However, they have associated with them specific problems, inefficiencies and limitations of form and function to which this invention is drawn. The aquarium stand particularly for display purposes is a one-piece unit, usually of furniture quality reinforced to hold weight, provide storage, and designed in a wide variety of styles and finishes to ensure that the finished display blends in with the style and décor of the existing room where the aquarium is to be kept. This basic design poses certain problems. To begin with, the unit is heavy and cumbersome which leads to high costs of shipping and always the possibility of damage while in transit. Factoring in this possibility leads to overall higher prices and possible economic loss if at any point the unit sustains damage while it is sent from the factory to the distributor, to the pet or furniture store, then on to the end user.

Another main problem of aquarium stands of the prior art is that after some time end users change the décor of the room where the aquarium is kept. In order to change the aquarium stand the whole system must be dismantled, the tank, equipment and the animals in the tank must be moved twice. This leads to expensive and time-consuming dismantling and reinstallation of the system. This process exposes the animals to stress, unsettles the established system and of course creates the possibility of breakage during the operation. Furthermore, sometimes the aquarium stand becomes damaged from moisture or corrosion. These custom repairs are expensive and often require the system to be dismantled to effect the repairs or replace the unit.

Where aquariums are set up temporarily, the one-piece unit method is inconvenient and inefficient; this is seen in aquarium shows across the country. People transport, set up and break down aquariums, and often sustain damage to the expensive custom stands. This leads to the requirement for skilled movers and still poses a threat for possible economic loss if in the course of transporting, setting up and breaking down damage occurs to the unit.

Aquarium stands of the prior art perform only two functions: they support the aquarium above the ground and add a decorative element with storage to the aquarium display. However, if the form and function of the aquarium support system is contemplated it becomes obvious that there is so much more function and form that is possible with the aquarium stand. This invention eliminates the problems, inefficiencies, and limitations of the aquarium stands of the prior art. Furthermore, the invention performs new functions and offers new features, benefits and form to the current state of the art of supporting the aquarium and adding functional and decorative elements to the aquarium display.

Given the invention which will be explained and shown in detail, it becomes apparent that what is needed is a new system and method of supporting an aquarium that addresses these problems, inefficiencies and limitations and expands the functions of the aquarium stands methods and systems of the prior art.

A search of the prior art did not disclose any patents that read directly on the claims of the invention; however, for background purposes and as indicative of the art to which the invention relates, reference may be made to the following patents found in the search:

| U.S. PAT NO. | DATE ISSUED | INVENTOR | CLASS/SUBCLASS |
| --- | --- | --- | --- |
| 3566808 | March 1971 | Slate et al. | 108/157 |
| D240871 | August 1976 | Herman | D6/32 |
| 4179169 | December 1979 | Daniels et al. | 312/257 |
| D254994 | May 1980 | Miereanu et al. | D30/106 |
| 4267998 | May 1981 | Weirch | 248/165 |
| 4832421 | May 1989 | Shoffner | 312/263 |
| D304982 | December 1989 | Bush et al. | D6/479 |
| D3211571 | November 1991 | Lucariello | D30/101 |
| D324590 | March 1992 | Pixler | D30/102 |
| 5335605 | August 1994 | Drabuzyk | 100/153 |
| 5527103 | June 1996 | Pittman | 312/263 |
| 5645331 | July 1997 | Eddy et al. | 312/205 |
| 5954412 | September 1999 | Rutherford et al. | 312/258 |
| 6454261 | September 2002 | Ohira | 273/140 |
| 6619601 | September 2003 | Vall | 248/188 |
| 6658677 | September 2003 | Paul | 5/280 |
| 0089772 | May 2004 | Albrecht | 248/127 |

BRIEF SUMMARY OF THE INVENTION

The purpose of the invention is to provide a means of supporting an aquarium that provides strength and stability, ease of set up or knockdown, ease of storage while not in use, lower cost and risk during shipping and the ability to change the décor of the aquarium stand without having to dismantle the aquarium system and provide new function to the aquarium stand. The interlocking aquarium support system with interchangeable, multifunctional decorative façade provides a method and means of supporting an aquarium and utilizes a removable interchangeable decorative functional façade that adds new form and function to the current state of the art.

The aquarium support of the system stores or ships unassembled; this reduces the cost of shipping and makes handling and moving the support easy and manageable reducing possible damage. The support of the system may be manufactured of various materials and easily assembles by the interlocking and positioning of its elements without the use of tools or fasting hardware, this lowers overall costs, simplifies, and eliminates the need to construct a complicated piece of furniture. The invention provides complete support and stability to the aquarium and based upon its composite can be water and corrosion proof.

The front facade of the unit is separate yet positioned to cover the support stand and give the appearance that it alone is the complete support structure. It may have doors, may be used for storage and it can be easily replaced to provide a façade of different style or décor, offering another function for the aquarium display without dismantling or disturbing the system. The front façade may be manufactured from a wide variety of materials including wood, plastic or injection molded high-density foam which is faux painted to give the appearance of an intricate elaborately carved custom wood stand. Another material could be simple card board printed with graphics to provide a visual image or printed message.

In one embodiment of the invention, on the façade there is a means to connect optional equipment. This embodiment provides for an illuminated panel where graphics and print are displayed. Another embodiment of the invention provides for a façade to house electronics that control a water proof video monitor or an electronic device that would be connected to the façade by way of a waterproof wiring harness and be submerged in the aquarium. With this embodiment one could play a game of chance or skill in the aquarium with controls that are mounted on the façade outside of the aquarium. In this embodiment the façade is equipped with a means to receive coins in exchange for play.

The interlocking aquarium support system with interchangeable multifunctional façade separates the form and function of the systems of the prior art. The general thrust of the invention is to, with one element of the system, support the aquarium and with another element of the system provide an interchangeable façade that can offer a change of décor and functionality without dismantling the aquarium system.

The façade element of the system may be a one piece element or a front panel with doors and hinged sides. Whether the support system is used in a permanent display or used in a temporary display the façade element of the system easily pulls away from the aquarium and the support element of the system assembles and knocks down easily without the use of tools. It stacks and takes up a minimum amount of space for transportation.

BRIEF DESCRIPTION OF THE SEVERAL VEIWS OF THE DRAWING

DETAILED DESCRIPTION OF THE INVENTION

Figure 1:
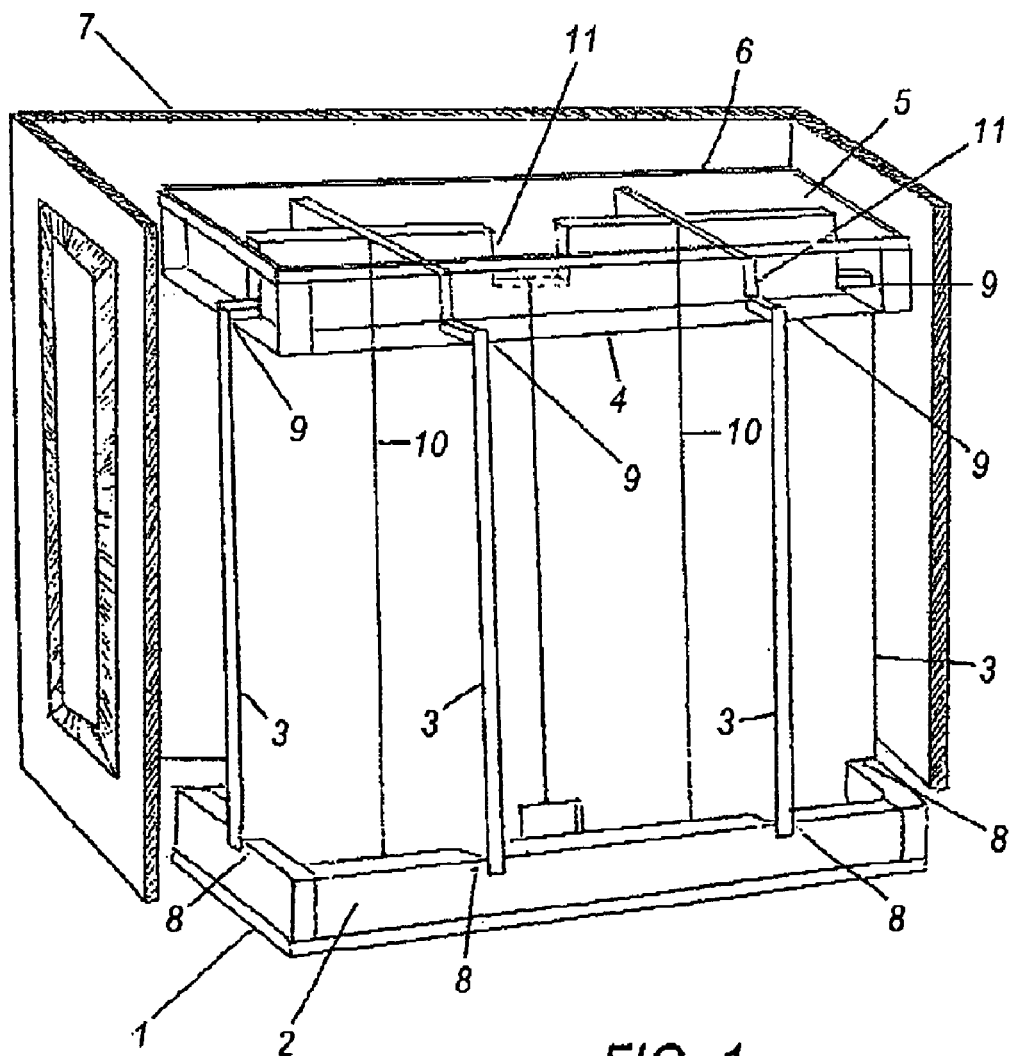
FIG. 1 is a general perspective view of the Interlocking Aquarium Support System with Interchangeable Multifunctional Decorative Façade.

The interlocking aquarium support system that utilizes an interchangeable multifunctional façade is comprised of a base (1), lower rail (2), vertical supports (3), an upper rail (4) a top (5), a layer of foam (6) and an interchangeable multifunctional decorative façade (7). The base, four vertical supports and top can be made of various materials or composites. The preferred embodiment of the invention (FIG. 1) uses ¾ inch plywood to form the base, vertical supports and top, and 2×4 wood studs to form the lower and upper rails. The lower rail is by a means permanently attached to the top of the base and of a size and shape that puts it at the outer perimeter of the base. The upper rail is by a means permanently attached to the bottom of the top and is of a size and shape that puts it at the outer perimeter of the bottom of the top. On the upper surface of the lower rail are cut six notches (8) spaced equally around the circumference of the rail. On the upper rail on the bottom surface are cut six notches (9) spaced equally around the circumference of the rail. All of the notches of the lower and upper rails are of the same size and shape and lock the vertical supports in place preventing movement of the aquarium stand under load.

The four vertical supports are of identical size and shape, cut from the center of one side of each of the vertical supports to the center of each of the supports are notches (10) forming channels of the same width of the supports by which two vertical supports can be interlocked and the other two vertical supports can be interlocked to form a pair of center supports. At all the corners of the vertical supports are cut notches (11) all of the same size and shape that communicate with the notches and inside sides of the lower and upper rails and the upper surface of the base inside the lower rail and the bottom surface of the top inside the upper rail. This communication of elements prevents forward, backward, diagonal, side to side and twisting movement of the aquarium stand under load and provides massive support strength. This arrangement of the pair of center supports sandwiched between base and top, interlocked and set in notches aligns at least one vertical support under the side walls of the aquarium and at least two vertical supports under the front and back walls of the aquarium as well as a vertical support running end to end and centered under the aquarium.

The layer of foam is placed between the top of the stand and the bottom of the aquarium (12). This foam layer provides support, compensates for unevenness and buffers vibration. The foam is at least ⅜ inch thick, has a vibration buffering quality and is the size and shape of the bottom of the aquarium.

The interchangeable decorative façade is designed to surround the stand and aquarium and provide a separate element that can be removed and replaced to change the outer appearance and add function to the aquarium stand. In the preferred embodiment of the invention (FIG. 1) the façade (7) is a one piece high density foam injected faux painted piece that exhibits detail and architectural elements that give the aquarium stand the look of antiquity at a cost far less than duplicating the same in custom wood cabinetry while providing the opportunity to change the façade and give the aquarium display a different décor.

Figure 3:
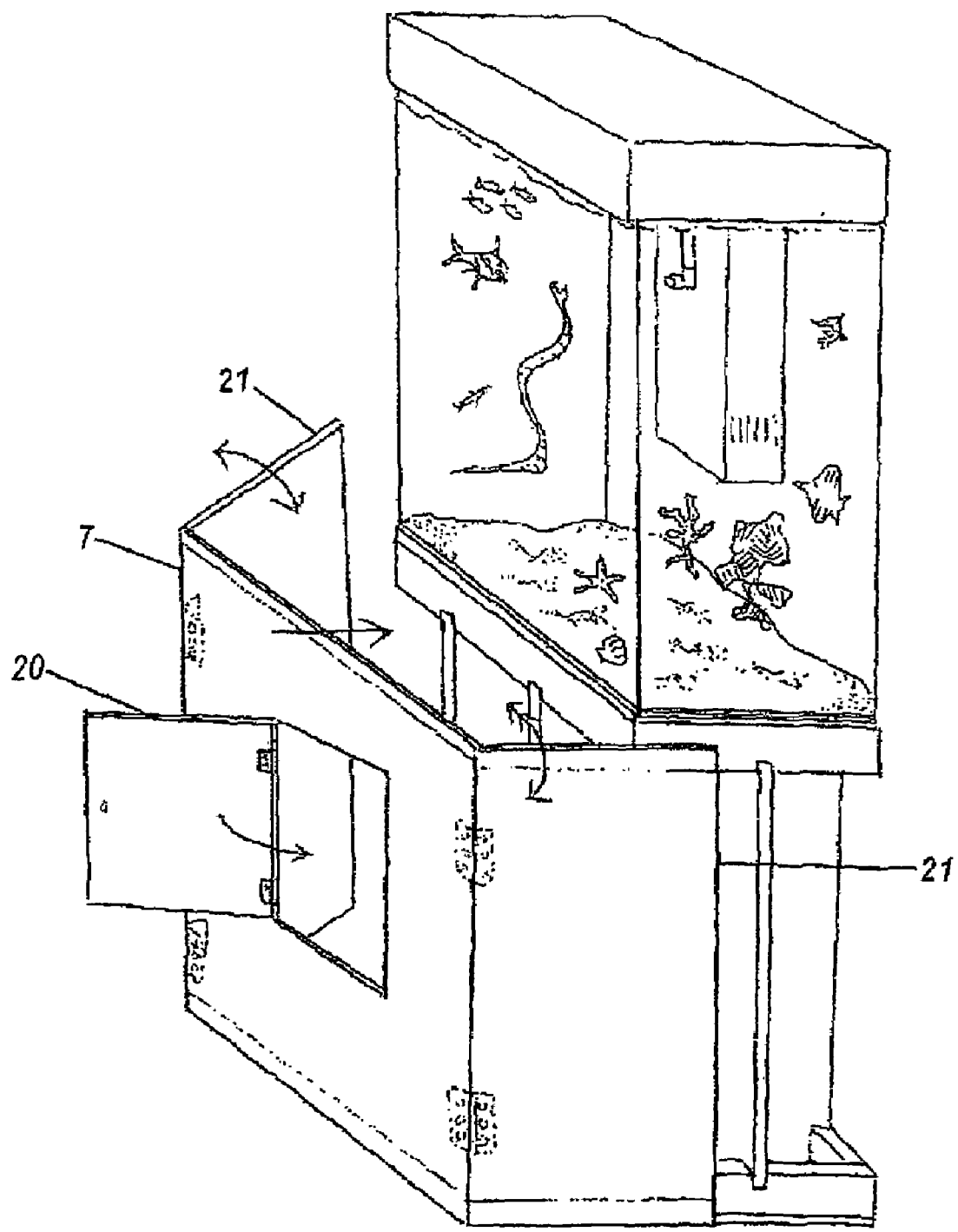
FIG. 3 is an illustrative drawing of a further embodiment of the Interlocking Aquarium Support System with Interchangeable Multifunctional Decorative Façade.

A further embodiment of the invention (FIG. 3) provides for the façade (7) to be fabricated from wood paneling designed with at least one door (20) to access storage where the sides (21) are hinged and fold in for easy storage and transportation. This embodiment gives the look and feel of a real wood stand yet at a lesser cost. This savings results from the use of light weight paneling not needing structural elements to support an aquarium.

Figure 4:
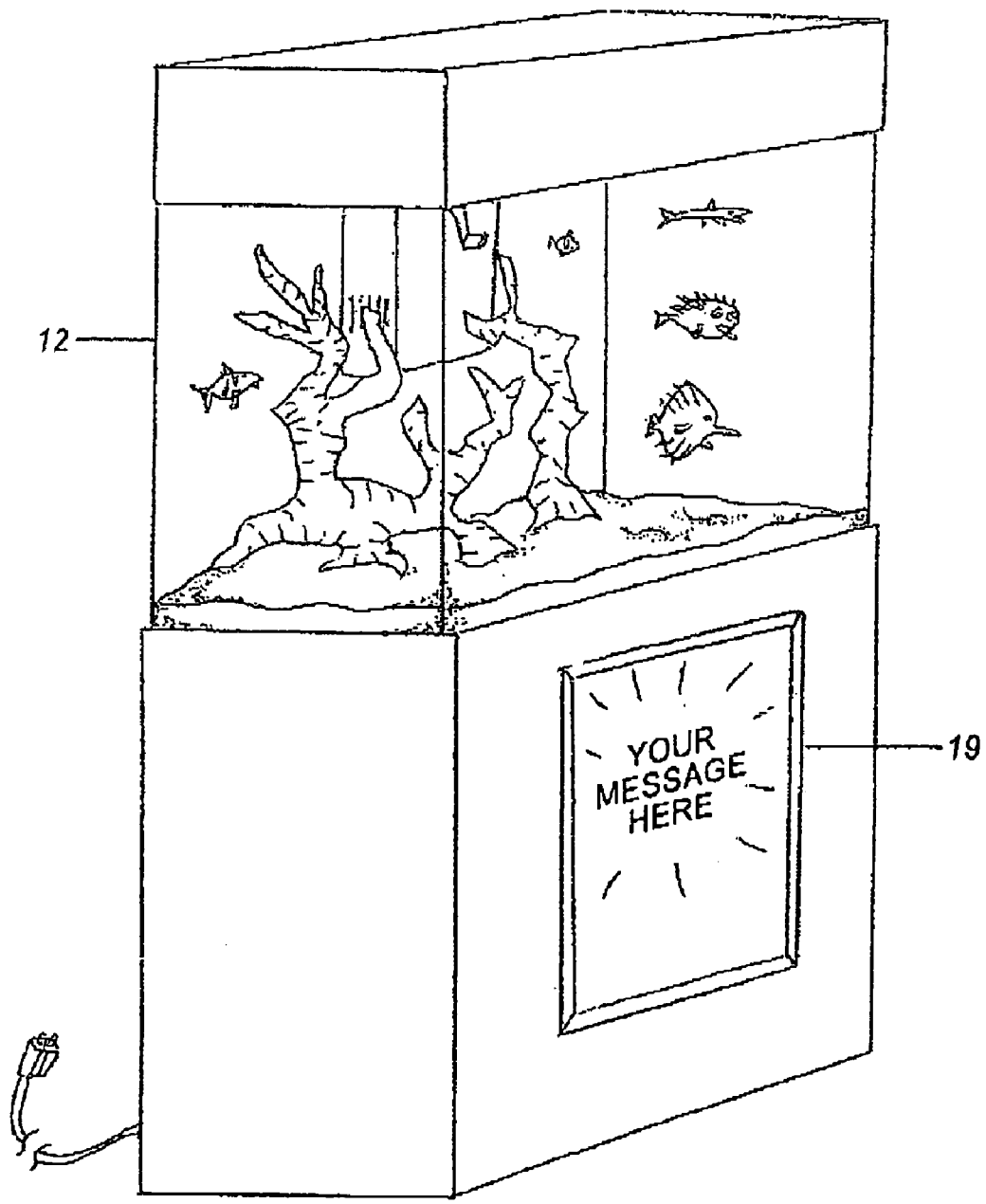
FIG. 4 is an illustrative drawing of a further embodiment of the Interlocking Aquarium Support System with Interchangeable Multifunctional Decorative Façade.

A further embodiment of the invention (FIG. 4) provides for a façade that has a means (19) for displaying graphics or a message that can be changed periodically, once again without disturbing the aquarium system.

Figure 5:
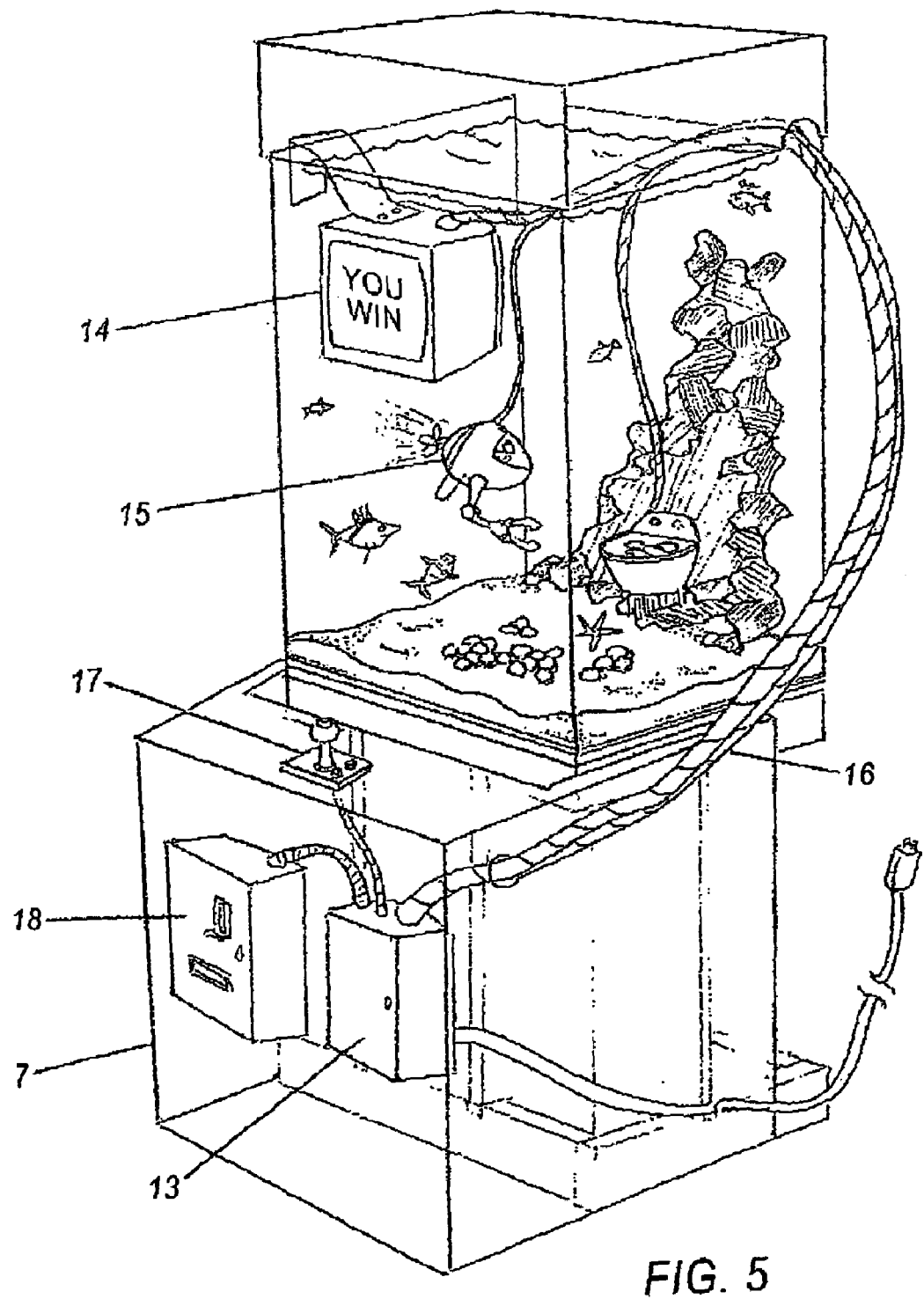
FIG. 5 is an illustrative drawing of a further embodiment of the Interlocking Aquarium Support System with Interchangeable Multifunctional Decorative Façade.

A further embodiment of the invention (FIG. 5) provides for a facade that houses electronics (13) that control a waterproof video monitor (14) and electronic device (15) that are submerged in the aquarium and are connected to the facade (7) by way of a water proof wiring harness (16). The controls (17) for the monitor and device are on the facade and allow one to play a game of skill or chance. Located on the front of the facade is a means to accept coins for play (18). Other embodiments may include a means of electronics that can retrieve and add data to a magnetic strip on a plastic card instead of or in addition to any means for accepting coins.

The aquarium stands and support systems of the prior art do not allow for complete center vertical support for the aquarium from end to end while still providing ample storage and giving the aquarium owner the ability to completely change the look and function of the aquarium stand by simply removing and replacing the front façade with out having to dismantle and disturb the whole aquarium system. This invention achieves what aquarium stands and supports of the prior art do not. It has separate form and function in one system. The system provides superior complete support with elements that compensate for vibration, unevenness, provide for storage, offer a simple process for changing the style and décor and function of the stand, and assembles and disassembles and stacks without the use of tools or fasteners. These benefits reduce overall cost, shipping cost, and eliminate the need for the complex engineering of a one piece custom hand made cabinet that has limited function. The invention creates a way to separate all that is decorative from all that is structural and adds new function to the aquarium stand.

Figure 2:
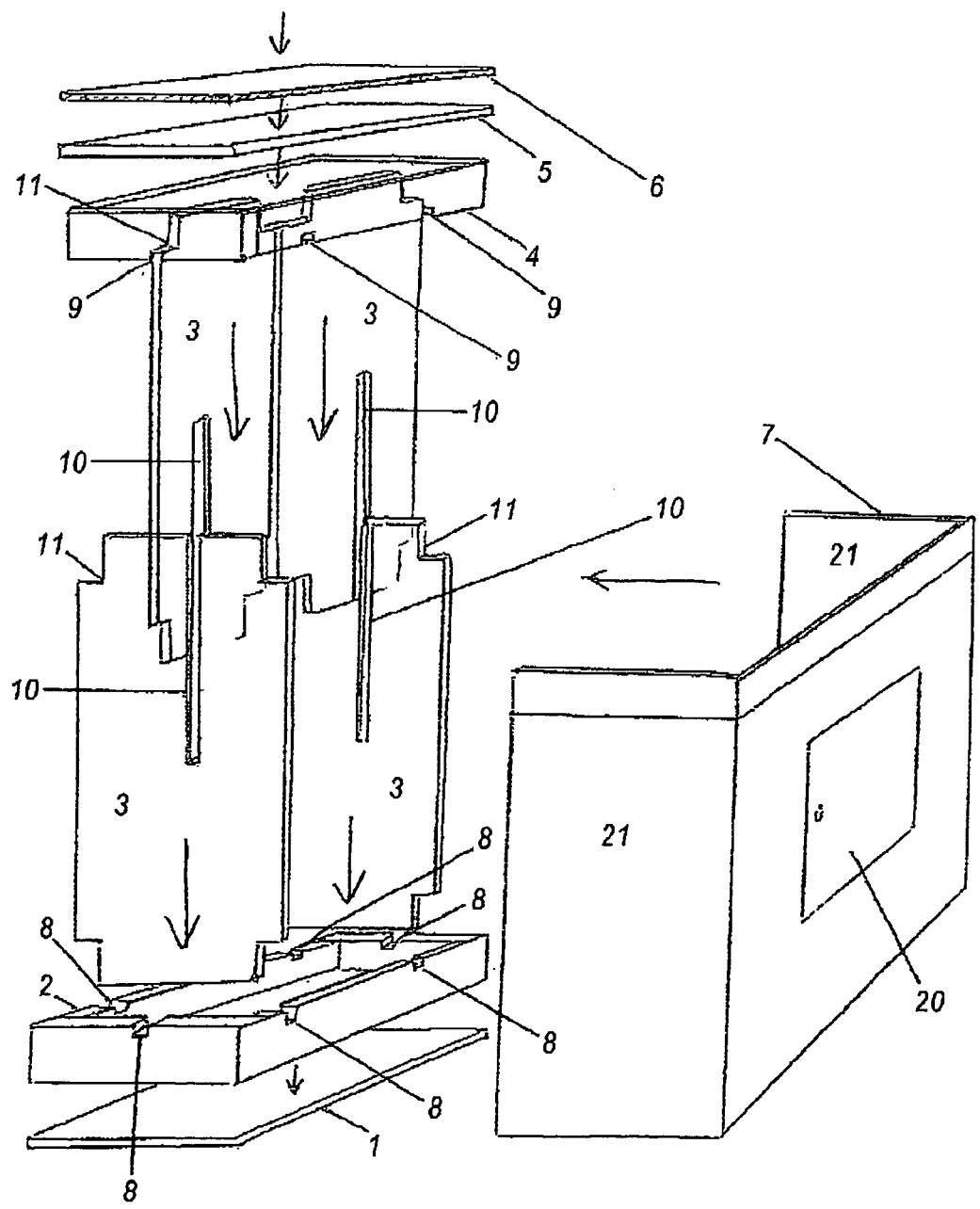
FIG. 2 is a schematic view of the preferred embodiment of the Interlocking Aquarium Support System with Interchangeable Multifunctional Decorative Façade.

The Interlocking Aquarium Support System with Interchangeable Multifunctional Decorative Façade in the preferred embodiment (FIG. 2) provides a design that can be executed by the use of one 4'×8' sheet of ¾ inch plywood and two 10' 2×4 wood studs, 20 3" nails a piece of foam and a light weight decorative façade. All of the plywood forming the base, top, and vertical walls are cut to the same size 18"×36". In this embodiment the front can be the back and the top can be the bottom and installation leaves very little room for error. One stand can be used to support an aquarium that is 18" wide by 36" long and two stands can be used to support an aquarium that is 18" wide by 72" long. Both are popular sizes in the aquarium industry.

While the preceding descriptions are directed to multiple embodiments of the invention, and the invention has been described in complete detail and illustrated in the drawings, it is not to be limited to such embodiments and details since many changes and modifications may be effected without departing from the spirit and scope thereof. The invention is described to cover any and all modifications, forms and arrangements which may come within the language and scope of the appended claims.

The invention claimed is:

1. A support and display system for an aquarium comprising:
    a support stand adapted to support an aquarium; and
    a decorative facade attached to said support stand without providing structural support for said aquarium, said facade being at least partially positioned around an outer periphery portion of said support stand, and wherein said façade is selectively removable from said support stand without disassembling said support stand.

2. A system according to claim 1, further comprising a foam layer adjacent to a top support of said support stand, said foam layer being adapted to provide support and vibration absorption for said aquarium.

3. A system according to claim 1, wherein said decorative facade comprises a high density foamed material.

4. A system according to claim 1, wherein said decorative facade is comprised of wooden paneling.

5. A system according to claim 1, wherein said decorative facade is comprised of multiple hinged sides that enable said decorative facade to be folded.

6. A system according to claim 1, wherein said decorative facade includes a door that provides access to an area enclosed by said decorative facade.

7. A system according to claim 1, wherein said decorative facade includes an illuminated panel adapted to display graphics.

8. A system according to claim 1, further comprising an electrical device located within said aquarium.

9. A system according to claim 8, wherein said electrical device is communicatively coupled to electronics housed in said decorative facade.

10. A system according to claim 9, wherein said decorative facade electronics are coupled to a joy stick that is communicative with said electrical device.

11. A system according to claim 9, wherein said electrical device is a game piece.

12. A system according to claim 9, wherein said electrical device is an electronic monitor.

13. A system according to claim 9, wherein said decorative facade includes a coin receptor coupled to said decorative facade electronics.

14. The system according to claim 1, wherein said support stand is disposed within a cavity formed by said decorative façade.

15. A support and display system for an aquarium comprising:
    a support stand adapted to support an aquarium;
    wherein said support stand comprises a base, a lower rail, at least one vertical support, an upper rail, and a top support; and
    a decorative facade attached to said support stand without providing structural support for said aquarium, said facade being removable from said support stand without disassembling said support stand.

16. A system according to claim 15, wherein said lower rail is connected to a lower portion of said at least one vertical support by at least one notch and said upper rail is connected to an upper portion of said at least one vertical support by at least one notch.

17. A system according to claim 15, wherein said base, said at least one vertical support, and said top support are formed of a three-fourth inch plywood.

18. A system according to claim 15, wherein said lower rail and said upper rail comprise two-by-four inch wooden studs.

* * * * *